UNITED STATES PATENT OFFICE.

DAVID STEINERT, OF HAMBURG, GERMANY.

IMPROVEMENT IN VARNISH FOR MAKING PRINTERS' INK AND FOR OTHER PURPOSES.

Specification forming part of Letters Patent No. 39,968, dated September 15, 1863.

*To all whom it may concern:*

Be it known that I, DAVID STEINERT, of the free city of Hamburg, Germany, have discovered certain new and useful Improvements in Varnish for Making Printers' Ink and for other Purposes; and I do hereby declare that the following is a full and exact description of the same.

In this description I presume the reader to be already familiar with the art of manufacturing varnishes from ordinary materials, and with the difficulties attending the substitution of rock-oil (known as "petroleum") for the linseed-oil formerly used.

I use petroleum with success, and produce printers' ink (black and colored) of excellent quality and well-drying oil-colors at a lower cost than the same quality can be produced by any other means known to me.

It has long been known that petroleum will dissolve resinous gums and allow the incorporation of coloring-matter; but the varnishes, inks, paints, &c., produced thereby have been all inferior in quality, or have cost more in their manufacture.

I make in accordance with my invention two kinds of varnishes. From the first I manufacture printers' ink, and from the second I manufacture oil-colors.

To enable others skilled as above described to make and use my invention, I will proceed to describe my mode of operation.

To make a varnish for printers' ink I agitate together one hundred and fifty pounds of rosin, and one hundred pounds of refined petroleum at a temperature of from 60° centigrade (140° Fahrenheit) to 90° centigrade, (194° Fahrenheit). At these temperatures a solution is rapidly effected, and the product, when cooled, is a clear and thick varnish of a reddish-brown color and very transparent. This varnish, on being ground together with the ordinary coloring-matter in sufficient quantity to give it the right consistency—say one part of lamp-black with two parts of the varnish, by weight—and again agitated at a temperature of from 60° centigrade (140° Fahrenheit) to 80° centigrade, (176° Fahrenheit,) with the addition of from five per cent. to ten per cent. of the entire mass of common yellow soap, produces an ink of good quality adapted for all kinds of printing, and possessing the property of drying rapidly.

To make a varnish for oil-colors I add to one part, by weight, of the above-described thick varnish two parts of refined petroleum, and add further soap, the quantity of the latter now added being five per cent. of the entire mass—*i. e.*, five per cent. of the combined varnish and petroleum, and expose the whole to a temperature of 80° centigrade, (176° Fahrenheit,) and agitate gently until the soap is dissolved and the fluid appears clear and transparent. I pass this thin varnish through a thin filter and grind it with colors in the ordinary manner, producing oil-colors of good quality, which may be applied to wood, stone, paper, and all stuffs to which linseed-oil paint is applicable.

I have used other resins in the manner above described besides common rosin, and the effect has been very satisfactory. I have used gum-arabic, and even gum-copal, in this manner, and believe that all resinous gums may be used with good effect in the manufacture of this varnish.

I can change the proportions of the gum and of the petroleum and soap each to the other constituents within quite wide limits, and the changes in the proportions, as also in the quality, of the ingredients will affect the properties of the varnish and of the compounds produced therefrom. In the production of inks for printing upon different kinds of material, and with different systems of printing—as, for example, lithographic stones, as distinguished from metal types or wood blocks—this variation of ingredients is of service, and may be performed as circumstances shall require, even to the extent of making the gum in some instances one-half the weight of the petroleum and in other instances double the weight of the petroleum.

If the soap is reduced greatly in amount or omitted altogether in the thick varnish first described, a very clear and desirable varnish is produced by operating in other respects as described; but the inks made therefrom will not dry quickly. I do not consider it expedient ever to omit the soap in the second—the thin varnish for oil-colors.

If in the manufacture of the latter I neglect to take the steps above described, and proceed to make it by the direct admixture and heating of the quantities of petroleum and rosin prescribed, the product is not as good, by reason of its becoming turbid very easily.

Oil-colors for all kinds of painting prepared by the several steps above described are much easier applied than linseed-oil colors, and yet dry quicker, without impairing the durability. The painting with these colors is of a richer gloss, and, at the present prices of materials, may be effected with much less expense than with linseed-oil colors.

In painting with my improved material no siccatives need be added.

Printers' ink made with my improved material, though it adheres very firmly to the paper and is perfectly durable under all ordinary conditions, has the peculiar advantage that it may be removed by treating the paper with soda in a grinding apparatus, and the paper reduced again to a white pulp, suitable for the manufacture of more paper as white as before. This is a great advantage in the present scarcity of white material and high price of white paper.

My thick varnish, prepared as described, independently of the soap, is clear and permanent, and better adapted to serve both the uses of receiving color for printers' ink and receiving more petroleum and being converted into oil-paint than any varnish from these materials, or any other of equal moderate cost known to me, and by reason of the moderate heat employed the danger of fire is much less than with ordinary materials and ordinary processes; and my varnish prepared therefrom by dilution and reheating, as described for oil-colors, produces, by subsequent grinding with colors and the addition specified, a better and quicker-drying and more durable paint than any other of equally moderate cost known to me.

My addition of soap in the manner and under the conditions prescribed gives the varnish, inks, and paints a property of drying rapidly and perfectly without detracting from the permanence and other desirable qualities of the goods, and at a cost for material and labor which is very slight.

What I claim as my invention, and desire to secure by Letters Patent, is—

1. The within-described production of thick varnish, the same consisting of refined petroleum and resin or resinous gums, the latter in very large proportion, with or without the addition of soap, the ingredients being agitated together at the temperatures designated, as and for the purpose herein set forth.

2. The within-described production of thin varnish, the same consisting, first, of refined petroleum and resin or resinous gum, the latter in very large proportion, with or without the addition of soap, and ultimately of a much larger proportion of petroleum, the ingredients being agitated at the temperatures designated, while the proportion of petroleum is small, then cooled, and subsequently again agitated at the moderate temperatures designated, as and for the purpose herein set forth.

3. The use of soap in combination with petroleum and resin or resinous gum, as and for the purpose set forth.

In testimony whereof I have hereunto set my name in the presence of two subscribing witnesses.

DAVID STEINERT.

Witnesses:
WILLIAM SCHOLZ,
DAVID WETHENING.